Patented Feb. 27, 1945

2,370,386

UNITED STATES PATENT OFFICE 2,370,386

ASPHALT COMPOSITIONS

Alvin P. Anderson, Berkeley, and Fred H. Stross, Oakland, Calif., assignors to Shell Development Company, San Francisco, Calif., a corporation of Delaware No Drawing. Application December 8, 1941, Serial No. 422,100

16 Claims. (Cl. 106—273)

This invention deals with the manufacture of asphaltic materials and of products containing the same. It is more particularly concerned with the coating of surfaces with asphalts and with the adhesion of asphalt coating in the presence of moisture. This invention is especially useful in the production of bituminous compositions, pavements, roads, floors, paints, rust preventives and the like.

The term "asphalt" as used in describing this invention is meant to include bituminous materials containing asphaltenes or tarry constituents and comprises, for example: petroleum residues, pitches, road oils, albino asphalts; asphalt cutbacks, or solutions; cracked, straight run or natural asphalts; naturally occurring asphaltic rocks; tars and pitches derived from the distillation or extraction of coals, shales, lignites, wood, etc.

These asphaltic materials in general contain certain amounts of asphaltic acids which are often partially or completely neutralized by alkalis or alkaline earths. The metallic ions may either have been present in the asphalt or crude oil originally or may have been introduced during refining treatments, e. g. breaking of crude oil emulsions, distilling over alkalis, etc.

In refining operations, water-soluble alkalis are often added in small amounts to asphaltic stocks in order to decrease the corrosive properties of asphaltic acids, etc., by transforming them into soaps or salts. Frequently it happens that the amount of alkali added exceeds the neutralizing power of the asphalt and free alkali is present in the form of hydroxide or carbonate. Free alkalis may also be liberated from asphaltic salts under the influence of moisture, heat, or in the presence of other metals or bases through hydrolysis or metathesis. Asphalts normally contain below 1% of alkaline salts and below 0.1% of free alkali. Certain unusual asphalts, so-called soda asphalts, may, however, contain much greater amounts, i. e. above 10% and up to 50%, of alkaline salts and free alkalis. The treatment of such unusual asphalts is not contemplated in this invention.

It is well known that most asphalts have relatively good covering and adhesive properties to dry solids such as rocks, stones, sand, cement, iron, glass, etc. However, when the solid is moist or wet, it often becomes difficult or impossible to obtain a satisfactory bond between the aggregate and the bitumen. Furthermore, when a solid, however coated, is exposed to water, it often happens that water displaces more or less rapidly the asphalt from the solid or even may strip it completely.

This hydrophobic behavior of asphalts is of great importance, particularly in the building of roads with unemulsified asphalts, since it is in general necessary to employ dry aggregate for construction and this involves costly drying or waiting for propitious weather. Furthermore, roads after construction may disintegrate under the influence of rain or telluric moisture when the bond between asphalt and aggregate fails. These difficulties are in general more pronounced in the case of acidic than basic aggregates. Thus in the past considerable effort was directed toward providing methods for successfully coating wet aggregate with asphalt and producing water resistant coverings.

The use of asphaltic emulsion or of low penetration paving asphalts may overcome these difficulties to some extent but is often too cumbersome and unreliable.

It has been repeatedly proposed to improve the water resistance of bonds between asphalts and solids, or the spreading tendency of asphalts upon wet surfaces or both these properties, by the addition of relatively small amounts, e. g. .5% to 2.0%, of various substances sometimes called "bonding agents."

In order to determine whether a given substance acts as a bonding agent, it is in general sufficient to perform a Total Water Immersion Test with a given aggregate and asphalt, as will be hereinafter described.

Bonding agents may be applied in many ways depending on the particular circumstances of their use. Thus they may be incorporated into the asphalt, either directly by thorough stirring, or by first dissolving them in a solvent and then commingling the solution with the asphalt. Moderate heating may be helpful. They may also be applied to the aggregate prior to the application of the asphalt, e. g., in the form of a solution in an organic solvent or as an aqueous solution or emulsion, or by other suitable means. When producing asphalt concrete it is sometimes convenient to admix them during the mixing of the asphalt and the aggregate.

As the necessary quantity of the bonding agents is small relative to that of the aggregate, it is in general advantageous to disperse them in a carrier fluid in order to insure thorough dispersion. The asphalt itself is almost always the most advantageous carrier and the favorite method of applying bonding agents is to disperse them in the asphalt.

Bonding agents may in general be classified, according to their surface activity, into surface inactive, anion-active and cation-active agents. Most bonding agents fall in the last two categories, but it must be noted that not all surface-active agents possess bonding powers when used as asphalt additives.

Among surface inactive bonding agents, paraffin wax, montan wax and similar materials may be cited. They decrease the stripping tendency of asphaltic coats by imparting to the asphaltic film a rigidity which is sometimes sufficient to counteract the capillary forces exerted by water. These surface inactive bonding agents have very little effect in facilitating the coating of wet aggregate with asphalt, and in the presence of stress, vibration or elevated temperature as encountered in most road applications, the rigidity which they impart is often not sufficient to prevent stripping.

Anion-active bonding agents comprise, for example, higher saturated fatty acids, having, for example, at least 10 carbon atoms, naphthenic acids and some sulfonic acids found in petroleum sludges. These agents are effective towards basic rocks such as limestone, to facilitate their being coated when wet and to prevent their being stripped. These agents have, however, little or no effect on acidic rocks such as granite. A rather complicated and not always effective method of rendering acidic rocks susceptible to these agents consists in pre-coating them with a hydroxide of a polyvalent metal.

Cation-active bonding agents which are effective on acidic rocks comprise many lipophilic cation surface-active compounds such as, for example, most quaternary ammonium compounds, primary, secondary or tertiary mono or poly amines, aliphatic, cyclic, nuclear or extranuclear, comprising at least one aliphatic saturated chain of 12 or more carbon atoms; many of their derivatives such as chloro-, hydroxo, sulfo-, ether, ester, etc., as well as mixtures of these compounds; analogous sulfur, phosphorus, arsenic, antimony, etc., derivatives; their salts, etc. Such compounds include, for example, trimethyl cetyl ammonium, lauryl pyridinium salts; methyl stearyl amine, chloro palmityl amine, stearic ester of ethanol amine, etc.

Cationic bonding agents which were found to be very satisfactory may be obtained from wax by chlorination and ammonolysis, the former being conducted at a temperature of about 110° C. until a chlorine content of about 30% is reached, and the latter taking place at about 150° C. in the presence of a solvent such as alcohol. In the following description these cation-active compounds will be referred to as "paraffin wax amines," or "wax amines" for short. Preparation and application of these wax amines are more fully described in the co-pending application of Thomas E. Reamer, Serial No. 422,081, filed December 8, 1941.

The use of cation-active bonding agents is subject to many difficulties such as low solubility in asphalts, misleading rigidity effects which are difficult to appreciate, high cost, or thermal instability. The latter factor is of great importance since asphalts and asphaltic cutbacks are shipped in heated tank cars and other containers and are often heated prior to application for greater fluidity and covering power.

A further disadvantage of cation-active bonding agents is that their activity and stability depend greatly on the nature of the asphalt. Thus a compound may have excellent bonding power and excellent stability when used with some asphalts, while it may have very unsatisfactory bonding power or stability with another asphalt. Often several batches of asphalt of the same crude and refined by the same procedure show marked differences in their response to cation-active bonding agents. Hereinafter we shall call asphalts which affect adversely the bonding power or stability "incompatible." Asphalts which do not possess these properties will be called "compatible."

Incompatibility or compatibility of an asphalt may be determined by the Total Water Immersion Test prior to heating and after heating as later described.

It is an object of this invention to improve the compatibility of incompatible asphalts and to render them compatible with cation-active bonding agents. Another object is to provide cation-active bonding agents which render compatible asphalts with which they are commingled. Still further objects will be found in the improvements hereinafter disclosed.

This invention is based on the discovery that a cause of incompatibility of asphalts lies in the presence of deleterious water-soluble free alkali or free alkali-forming components or impurities.

Our novel process comprises the steps of inactivating these deleterious substances present in an asphalt, whereby its compatibility toward treatment with a cation-active bonding agent is improved, and adding such agent. Water-soluble free alkalis which are to be inactivated according to this invention by neutralization, elimination or precipitation are substances which are soluble in water to the extent of more than about 0.5% and when dissolved in water yield solutions having a pH above 9. Such substances comprise, for example, the hydroxides of sodium, potassium and other alkaline metals, ammonia, quaternary ammonium hydroxides, hydroxides of many metallic complexes, carbonates, borates, phenolates of alkali metals, etc.

Substances capable of forming free water-soluble alkalis under normal conditions of application of asphalts, i. e. heating to moderate temperatures of the order of 200° F. to 400° F., exposure to air, steam or water, comprise easily hydrolyzable salts of weak acids such as asphaltic acids, thiophenol, certain sulfated carboxylic acids used or crude oil emulsion breakers, e. g. Turkey red oils, etc.

Means for inactivating deleterious water-soluble free alkalis or substances forming water-soluble alkali or both are well known. Suitable methods include, for example:

1. Extraction with chemically inert selective solvents for the alkali such as water, methyl or ethyl alcohol, acetone, etc., or their mixtures or many other substantially asphalt-insoluble liquids having a dielectric constant substantially higher than that of the asphalt.

2. Treatment with, or addition of, acids capable of neutralizing free alkali by forming salts which do not liberate free alkali, such as, for example, sulfuric, phosphoric, hydrochloric acids, organic sulfonic acids such as mahogany acids or acids found in some petroleum acid treating sludges, and other strong acids, i. e. acids capable of forming non-hydrolyzing salts of alkali metals, medium strength acids such as hydrofluoric, acetic and other carboxylic acids, particularly saturated higher fatty acids, etc.

Both oil-soluble and oil-insoluble acids may be used for neutralizing free alkali actually present. However, in order to be effective towards potential free alkalis, the acidic substance should be asphalt-soluble so as to remain in the bitumen until the free alkali is available for neutralization.

3. Addition of salts capable of forming by metathesis with the alkali-forming components of the asphalt, products which do not form free alkali such as, for example, calcium chloride, iron chloride, zinc sulfate, lead acetate, and other salts combining a strong acid with a metal belonging to periodic groups 2-8, forming insoluble non-hydrolizing asphaltic soaps and especially of metals having a valence of 3 or more and capable of forming weakly acidic hydroxo complexes, i. e. so-called "basic salts," such as iron, trivalent chromium, aluminum, lead, etc.

4. Addition of substances capable of forming products which can neutralize free alkali, such as acid anhydrides, acid chlorides, aldehydes, lactones, esters, etc.

The inactivating treatment obviously has to be itself compatible with both asphalt and the cation-active bonding agent, i. e. it must be chemically inert towards both. Thus, for example, strongly oxidizing acids capable of destroying the bonding agent under conditions of use such as perchloric, chloric, chlorous, permanganic, nitrous acids, etc., or salts of metals readily forming complexes with the bonding agent such as those formed by copper cobalt, etc., with primary amines, etc., may not be employed, or substances deleterious to the asphalt such as copper sulfate which catalyzes oxidation of the asphalt, concentrated sulfuric acid, etc., are not advisable unless used in small controlled quantities.

When the inactivating treatment involves extraction, it is preferred to conduct it prior to addition of the bonding agent.

Treatment with acids to remove free alkalis may be effected by thoroughly contacting the asphalts with the acid, for example by percolating a dilute solution of acid through the asphalt that has been liquefied as by melting. If asphaltic soaps are present, it is desirable to perform this operation at a high temperature so as to hydrolyze and neutralize at least part of these soaps and decrease their alkali-forming tendency.

Asphalt-soluble substances which are added according to this invention in order to be fully effective should be thoroughly dispersed in liquefied asphalt.

Salts may be introduced into the asphalt in finely pulverized form and thoroughly dispersed by energetic mechanical agitation or blowing with superheated steam or other inert gases.

As has been already briefly stated, it was found that the presence of free alkalis and free alkali-forming substances causes asphalts to be incompatible with cationic bonding agents. It is believed that free alkalis cause incompatibility by at least one of two distinct actions:

1. At low temperature, free alkalis prevent the bonding action of the cationic agents without destroying them. This may be due to repression of the dissociation of the cationic agent, or by displacement of lipophilic cations by hydrophilic alkali metal ions on the surface of the asphalt or by decreasing the interfacial tension between water and the solid, or by a combination of these effects. This effect is reversible, neutralization of the free alkali restoring the bonding activity.

2. At higher temperature, free alkalis may actually destroy cationic agents by hydrolysis, oxidation, polymerization, or a combination of these irreversible reactions. These reactions are slow at room temperature and are hardly noticeable over periods of weeks with most bonding agents and usual concentrations of free alkalis, but their rate increases markedly with temperature. This effect is irreversible.

Concerning asphaltic soaps of alkaline metals, at room temperature they do not interfere noticeably with cationic bonding agents. At higher temperatures, however, and particularly in the presence of traces of moisture, they liberate sufficient amounts of alkalis to progressively destroy the bonding agent.

The step of inactivating the alkali may consequently be performed either prior to or simultaneously with or after treatment with the cationic bonding agent, unless this step is itself harmful to the bonding agent, in which case it should be performed prior to the addition of the bonding agent, and in any case it should be performed before the asphalt containing the bonding agent is subjected to heating or prolonged storage.

Extraction with a solvent, if it is capable of removing both free alkali and the bonding agent, should of course be performed prior to the addition of the agent.

According to a preferred method of applying our invention, the practice of which is particularly simple, the inactivating treatment consists in the addition to, and thorough dispersion in, the asphalt of an additive comprising inactivating agents commingled with bonding agents. Thus, for example, wax amine and an insoluble acid may be dissolved in a solvent such as kerosene, lubricating oil or preferably an aromatic solvent such as an $SO_2$-extract of kerosene; or, for example, lauryl pyridinium bromide, may be dissolved in a lubricating oil extract and finely powdered calcium chloride dispersed therein, to form a viscous paste; and the resulting solution or mixture, as the case may be, is then thoroughly mixed with a molten incompatible asphalt.

The proportion of the inactivating agent admixed with 100 gm. of cationic bonding agent should be sufficient to inactivate about 40-120 gm. of NaOH. Since cationic bonding agents have in general equivalent weights above 200, such a composition comprises at least two equivalents of inactivating agent per cationic bonding agent. Thus about 50-150 parts of $CaCl_2$ or 300-1000 parts of mahogany acids commingled with 100 parts of wax amine, and if desired suspended or dissolved in a suitable solvent, forms a bonding agent compatible with most paving asphalts when used in a proportion sufficient to provide 0.2%-1.0% of wax amine on the asphalt.

The inactivating treatment should be conducted so as to reduce the amount of free alkali to below 0.001% and that of free alkali-forming alkaline soap salts of asphaltic acids, so as to prevent liberation of free alkali, in the above amount. Ordinarily a content of a neutral soap not in excess of .1% is safe. Preferably, however, it is conducted so as to provide for the complete absence of free alkali and for an excess of free acidity sufficient to neutralize any free alkali that may be liberated by the alkaline soaps of asphaltic acids present.

Necessary quantities of inactivating agent vary with the nature of the asphalt and its content of free alkali or alkaline salts or both. The determination of these constituents may be effected by well known analytical methods, and equivalent amounts of inactivating substances are, in general, sufficient to render the asphalt compatible if thorough contact and dispersion are secured. However, this latter condition is often difficult to realize, especially on a commercial scale, and consequently it is advisable to use an excess of inactivating substance greater than 2 equivalents, such as 3-6 equivalents.

The following may further illustrate our invention:

The "Total Water Immersion Test" or T. W.

I. T., adopted to evaluate the bonding power of asphalts, is performed as follows:

Five hundred grams of an aggregate passing 1.5 inch screen but retained by .75 inch screen is immersed in water for 30 minutes, drained and mixed for five minutes with 35 gms. of asphalt cutback in a large porcelain dish by means of a large aluminum spoon.

The coated rock is placed in a wide mouth, screw top, pint jar and the lid tightened. After allowing it to stand for 30 minutes, the contents of the jar are covered with distilled water, the jar closed and placed in a thermostat bath at 105° F. for 3 hours.

At the end of this time the stones are individually inspected, while under water, and the surface which has remained covered is evaluated visually and averaged for all stones. The result is expressed in tenth of the surface, rounded to the nearest integer and is reported as the T. W. I. T. value. Accordingly, if the stones remain on the average 95% or more covered with the asphalt at the end of the test, the T. W. I. T. value is 10; if they remain 45–55% covered, the value is 5. T. W. I. T. values of 5 or less may be considered as showing unsatisfactory, while 6–8 show fair to good and 9–10 excellent bonding power.

*Example*

1% of the cation active wax amine described earlier was admixed with several commercial and some synthetic cutbacks. Part of each mixture was tested by the T. W. I. T. and the remainder heated in a ¾ filled glass pressure bottle at 250° F. for 1 week and tested again. The results are shown in the following table.

|  | Before heating | After heating |
|---|---|---|
| Cutback A | 8 | 8 |
| Cutback B | 5 | 2 |
| Cutback B extracted with water prior to addition of amine | 9 | 7 |
| Cutback C | 9 | 8 |
| Cutback C+.1% NaOH | 6 | 5 |
| Cutback C+2% naphthenic soap | 9 | 2 |

These results show that various asphalts have various degrees of compatibility with cationic bonding agent and that addition of free alkali or of free-alkali-forming naphthenic soaps to a compatible asphalt (cutback C) renders it incompatible.

We claim as our invention:

1. The process of improving the bonding power of asphalts which are incompatible with cationic bonding agents due to the presence in the asphalt of small amounts of impurities belonging to the group consisting of water-soluble alkaline compounds and compounds forming water-soluble alkalies upon hydrolysis, comprising the steps of inactivating said impurities in the asphalt and incorporating into said asphalt an oil-soluble cationic bonding agent in an amount sufficient to improve the bonding power of said asphalt.

2. The process of improving the bonding power of asphalts which are incompatible with wax amine due to the presence in the asphalt of small amounts of impurities belonging to the group consisting of water-soluble alkaline compounds and compounds forming water-soluble alkalies upon hydrolysis, comprising the steps of inactivating said impurities in the asphalt and incorporating into said asphalt an oil-soluble wax amine in an amount sufficient to improve the bonding power of said asphalt.

3. In the process of improving the bonding power of asphalts containing small amounts of impurities belonging to the group consisting of water-soluble alkaline compounds and compounds forming water-soluble alkalies upon hydrolysis, the steps comprising extracting said impurities from the asphalt with sufficient water to substantially remove said impurities and thereafter incorporating into said asphalt an oil-soluble cationic bonding agent in an amount sufficient to improve the bonding power of said asphalt.

4. The process of claim 1 wherein the inactivating is effected by removing said impurities.

5. The process of claim 1 wherein inactivating is effected by extraction with a liquid insoluble in said asphalt and having a dielectric constant substantially higher than that of the asphalt.

6. The process of claim 1 wherein inactivating is effected by extracting said asphalt with water.

7. The process of claim 1 wherein inactivating is effected by contacting said asphalt with an acid.

8. The process of claim 1 wherein inactivating is effected by incorporating into said asphalt an acid soluble therein.

9. The process of claim 1 wherein inactivating is effected by a metathetical reaction with a salt of a metal capable of yielding substantially water-insoluble hydroxides and asphaltic salts.

10. The process of claim 1 wherein inactivating is effected by incorporating into said asphalt a salt combining a metal and an acid, said metal being capable of yielding water-insoluble hydroxides and asphaltic salts and said acid forming non-hydrolyzing salts of alkali metals.

11. The process of claim 1 wherein inactivating is effected by incorporating into said asphalt a salt combining a metal and an acid, said metal being capable of having a valence of at least 3 and said acid forming non-hydrolyzing salts of alkali metals.

12. The process of claim 1, wherein inactivating is effected by incorporating into said asphalt lead acetate.

13. In the process of improving the bonding power of asphalts containing small amounts of impurities belonging to the group consisting of free and potentially free water-soluble alkalis, the steps of inactivating said impurities to reduce the alkali content to below 0.001% and incorporating into said asphalt an oil-soluble cationic bonding agent in amount sufficient to improve the bonding power of said asphalt.

14. The process of claim 13 wherein the inactivating is effected by treating said asphalt with an amount of inactivating agent equal to at least 2 equivalents of said alkalis.

15. The process of claim 13 wherein the inactivating is effected by treating said asphalt with an amount of inactivating agent equal to 3 to 6 equivalents of said alkalis.

16. In the process of improving the bonding power towards acidic rocks of asphalts containing small amounts of asphaltic salts of alkaline metals detrimental to the stability of cationic bonding agents, the steps of inactivating said salts and incorporating into said asphalt an oil-soluble cationic bonding agent in amount sufficient to improve the bonding power of said asphalt.

ALVIN P. ANDERSON.
FRED H. STROSS.